United States Patent
Itou

(10) Patent No.: US 7,049,788 B2
(45) Date of Patent: May 23, 2006

(54) POWER SOURCE DEVICE FOR ELECTRIC MOTOR

(75) Inventor: Yasuyuki Itou, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 74 days.

(21) Appl. No.: 10/725,367

(22) Filed: Dec. 3, 2003

(65) Prior Publication Data

US 2004/0136211 A1    Jul. 15, 2004

(30) Foreign Application Priority Data

Jan. 10, 2003    (JP) .............................. 2003-004858

(51) Int. Cl.
*H02J 7/00* (2006.01)
*H02P 1/00* (2006.01)

(52) U.S. Cl. ..................... 320/101; 429/23; 429/13; 318/139

(58) Field of Classification Search ................ 363/132, 363/131, 65, 95, 97; 318/139, 150, 161, 318/254, 376, 801; 307/66, 63, 68
See application file for complete search history.

(56) References Cited

U.S. PATENT DOCUMENTS 5,552,681 A * 9/1996 Suzuki et al. ............... 318/139
6,107,788 A  8/2000 Oya et al.
6,209,672 B1 * 4/2001 Severinsky ................ 180/65.2
6,583,519 B1 * 6/2003 Aberle et al. ............. 307/10.1

FOREIGN PATENT DOCUMENTS

| DE | 198 10 467 C1 | 10/1999 |
|---|---|---|
| DE | 100 06 781 A1 | 3/2002 |
| DE | 101 02 243 A1 | 10/2002 |
| JP | 2002-118081 | 4/2002 |
| JP | 2002-118981 | 4/2002 |
| WO | WO 99/46845 | 9/1999 |
| WO | WO 01/34424 A1 | 5/2001 |
| WO | WO 2004/014687 A1 | 2/2004 |

* cited by examiner

*Primary Examiner*—Rajnikant B. Patel
(74) *Attorney, Agent, or Firm*—McDermott Will & Emery LLP

(57) ABSTRACT

An electric motor (5) and an accessory circuit (7, 8) are connected in parallel to an output terminal (1A) of a fuel cell power plant (2). A secondary battery (3) is connected to the output terminal (1A) through a DC/DC converter (6) which controls an output voltage in both directions. The accessories (7, 8) are directly driven by the output of the fuel cell power plant (2). A reduction in the output voltage of the fuel cell power plant (2) resulting from an increase in the load of the electric motor (5) is prevented by discharging power from the secondary battery (3) via the DC/DC converter (6). By directly supplying electric current output from the fuel cell plant to the accessory circuit (7, 8) without passing through the DC/DC converter (6), the power loss due to the DC/DC converter (6) is reduced.

8 Claims, 5 Drawing Sheets

21 ACCELERATOR PEDAL DEPRESSION SENSOR
22 SOC SENSOR
23 FLOW RATE SENSOR
24 VEHICLE SPEED SENSOR

POWER SOURCE DEVICE FOR ELECTRIC MOTOR

FIELD OF THE INVENTION

This invention is related to a power source device using a fuel cell power plant to drive an electric motor.

BACKGROUND OF THE INVENTION

JP2002-118981A published by the Japan Patent Office in 2002 discloses a power source device for a vehicle using a fuel cell power plant and a secondary battery. The vehicle is driven using an electric synchronous motor controlled via an inverter.

The fuel cell power plant and a DC/DC converter which converts the voltage of the secondary battery are connected in parallel to the inverter. The inverter varies the direct current supplied from the fuel cell power plant or the DC/DC converter to a three-phase alternating current having an arbitrary frequency. The resulting current drives the electric synchronous motor used for driving the vehicle.

SUMMARY OF THE INVENTION

In the prior art power source device, a circuit is provided for driving devices which are accessory to the fuel cell power plant and accessory to the vehicle. Current supply to this circuit is supplied directly from the secondary battery rather than via the DC/DC converter. This has the effect that even when the DC/DC converter is malfunctioning, direct power supply from the secondary battery is possible.

As a result, supplied power to the accessory circuits from the fuel cell power plant passes through the DC/DC converter. This causes an energy loss which corresponds to the conversion efficiency of the DC/DC converter. This energy loss increases the fuel consumption of the fuel cell power plant.

It is therefore an object of this invention to increase the energy efficiency of the power source device that is provided with a fuel cell power plant, a power storage device, and a drive circuit of accessories.

In order to achieve the above object, this invention provides a power source device supplying power to an electric motor and an accessory circuit. The power source device comprises a fuel cell power plant having an output terminal to which the electric motor and the accessory circuit are connected in parallel, a power storage device connected to the output terminal and performs a charging operation and a discharging operation, and a DC/DC converter disposed between the power storage device and the terminal. The DC/DC converter regulates an input voltage of the power storage device in a charging operation and an output voltage of the power storage device in a discharging operation.

The details as well as other features and advantages of this invention are set forth in the remainder of the specification and are shown in the accompanying drawings.

DESCRIPTION OF THE PREFERRED EMBODIMENTS

Figure 1:
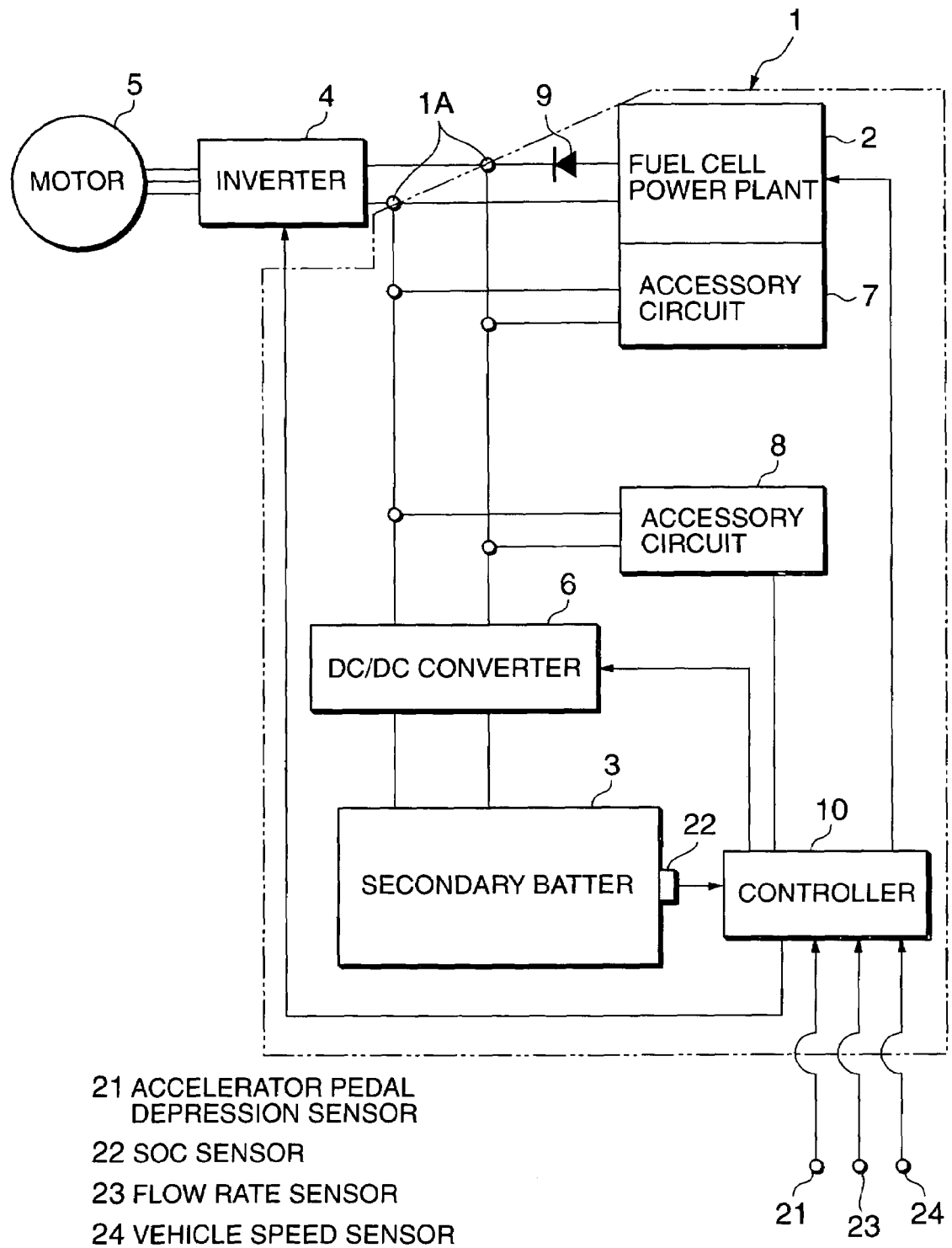
FIG. 1 is a schematic diagram of a power source device for a fuel cell vehicle according to this invention.

Referring to FIG. 1 of the drawings, an inverter 4 of a power source device 1 for a fuel cell vehicle converts a direct current output by both a fuel cell power plant 2 and a secondary battery 3 into a three-phase alternating current and supplies the resulting current to an electric synchronous motor 5. The electric synchronous motor 5 drives the vehicle by rotating the vehicle drive wheels not shown.

During vehicle braking, when rotational energy from the drive wheels is input to the electric synchronous motor, the electric synchronous motor functions as a generator which uses the three-phase current in power generation operations. The inverter 4 rectifies the three-phase alternating current to a direct current which is used to charge the secondary battery 3. Power generation operations during braking are termed "regenerative braking".

The inverter 4 comprises a pair of terminals 1A for direct current. The fuel cell power plant 2 is connected to the terminals 1A. A secondary battery 3 is connected to the terminals 1A via a DC/DC converter 6. A diode 9 is interposed between the fuel cell power plant 2 and the terminal 1A in order to prevent current from the secondary battery or current generated when the electric synchronous motor functions as a generator from flowing to the fuel cell power plant 2.

An accessory circuit 7 for the fuel cell power plant are connected to the direct current circuit connecting the DC/DC converter 6 and the terminals 1A.

The accessory circuit 7 comprises for example a pump for supplying hydrogen and air to a fuel cell stack, a pump for supplying reformate fuel and a heater for regulating the temperature of the reformer.

An accessory circuit 8 for the vehicle is also connected to the direct current circuit connecting the DC/DC converter 6 and the terminal 1A. The accessory circuit 8 comprises for example a vehicle lighting, an air conditioning system or an oil pump.

The fuel cell power plant 2 comprises a solid polymer fuel cell stack producing electrical power by electrochemical reactions between hydrogen and oxygen. The fuel cell stack may also comprise a soluble carbonate or a phosphoric-acid fuel cells. Hydrogen is obtained by reforming a hydrocarbon fuel such as gasoline or alcohol. It is also possible to use hydrogen stored in a hydrogen cylinder or in a hydrogen-storing alloy. This invention is not limited to a particular form of the fuel cell power plant.

The secondary battery 3 comprises a nickel hydrogen battery adapted for both charging and discharging operations. Instead of a secondary battery, it is possible to use a capacitor. The power storage device in the claims has general application to the secondary battery and the capacitor.

The secondary battery 3 performs discharging and charging operations via the DC/DC converter 6. The secondary battery 3 rotates the electric synchronous motor 5 via the DC/DC converter 6 and the inverter 4 and supplies electric power to the accessory circuits 7 and 8 via the DC/DC converter 6 when required.

The DC/DC converter 6 is a direct current voltage transducer for discharging and charging operation of the secondary battery 3. In other words, the DC/DC converter 6 has the function of controlling the voltage difference between the terminal 1A and the secondary battery 3.

The DC/DC converter 6 adjusts the output voltage of the secondary battery 3 to the terminal 1A to correspond with the output voltage of the fuel cell 2. The DC/DC converter 6 also adjusts the output voltage of the electric synchronous motor 5 when it functions as a generator and the output voltage of the fuel cell power plant 2 in order to charge the secondary battery 3.

Since the accessory circuits 7 and 8 are connected to the direct current circuit connecting the DC/DC converter 6 and the terminal 1A, the power required by the accessory circuits 7 and 8 can be supplied directly from the fuel cell power plant 2 without passing through the DC/DC converter 6 when the fuel cell power plant 2 is operating. On the other hand, when the fuel cell power plant 2 is stopped or starting up, power required by the accessory circuits 7 and 8 can be supplied from the secondary battery 2 via the DC/DC converter 6.

Since power supply to the accessory circuits 7 and 8 when the fuel cell power plant 2 is operating does not rely on the DC/DC converter 6, energy loss in the DC/DC converter 6 can be avoided when driving the accessory circuits 7 and 8 with the fuel cell power plant 2. The accessory circuits 7 and 8 are more often activated when the fuel cell power plant 2 is operating than when the fuel cell power plant 2 is stopped or being started. Thus connecting the accessory circuits 7 and 8 in the above manner makes it possible to reduce power loss in the power source device 1.

Furthermore power loss resulting from line resistance can be reduced to low levels by setting a length of wire connecting the accessory circuit 7 and the terminal 1A to be shorter than a length of wire connecting the accessory circuit 8 to the terminal 1A providing that the accessory circuit 7 consumes much more electric power than the accessory circuit 8.

Operation of the fuel cell power plant 2, switch control of the inverter 4 and control of the voltage difference in the DC/DC converter 6 are controlled by a controller 10.

The controller 10 performing the above control comprises a microcomputer provided with a central processing unit (CPU), a read-only memory (ROM), a random access memory (RAM) and an input/output interface (I/O interface). The controller 10 may comprise a plurality of microcomputers.

Signals are input into the controller 10 as detected data in order to perform this control. Signals are input from an accelerator pedal depression sensor 21 which detects the amount of depression of an accelerator pedal in a vehicle, a SOC sensor 22 which detects the state of charge (SOC) of the secondary battery 3, a flow rate sensor 23 which detects a flow rate of hydrogen in the fuel cell power plant 2 and a vehicle speed sensor 24 which detects a vehicle speed.

Figure 2A:
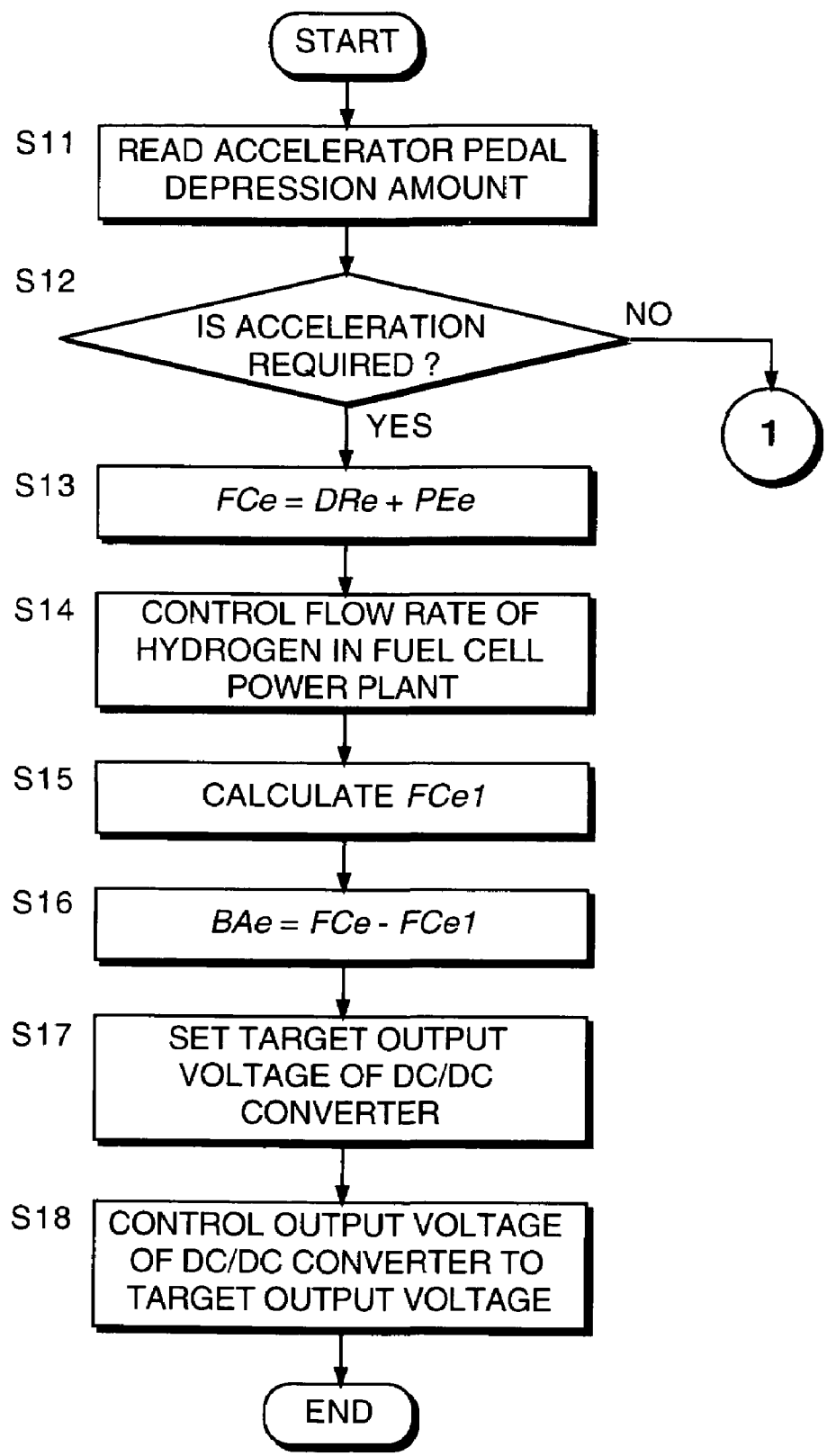
FIGS. 2A and 2B are flowcharts showing a power control routine for the power source device executed by a controller according to this invention.
Figure 2B:
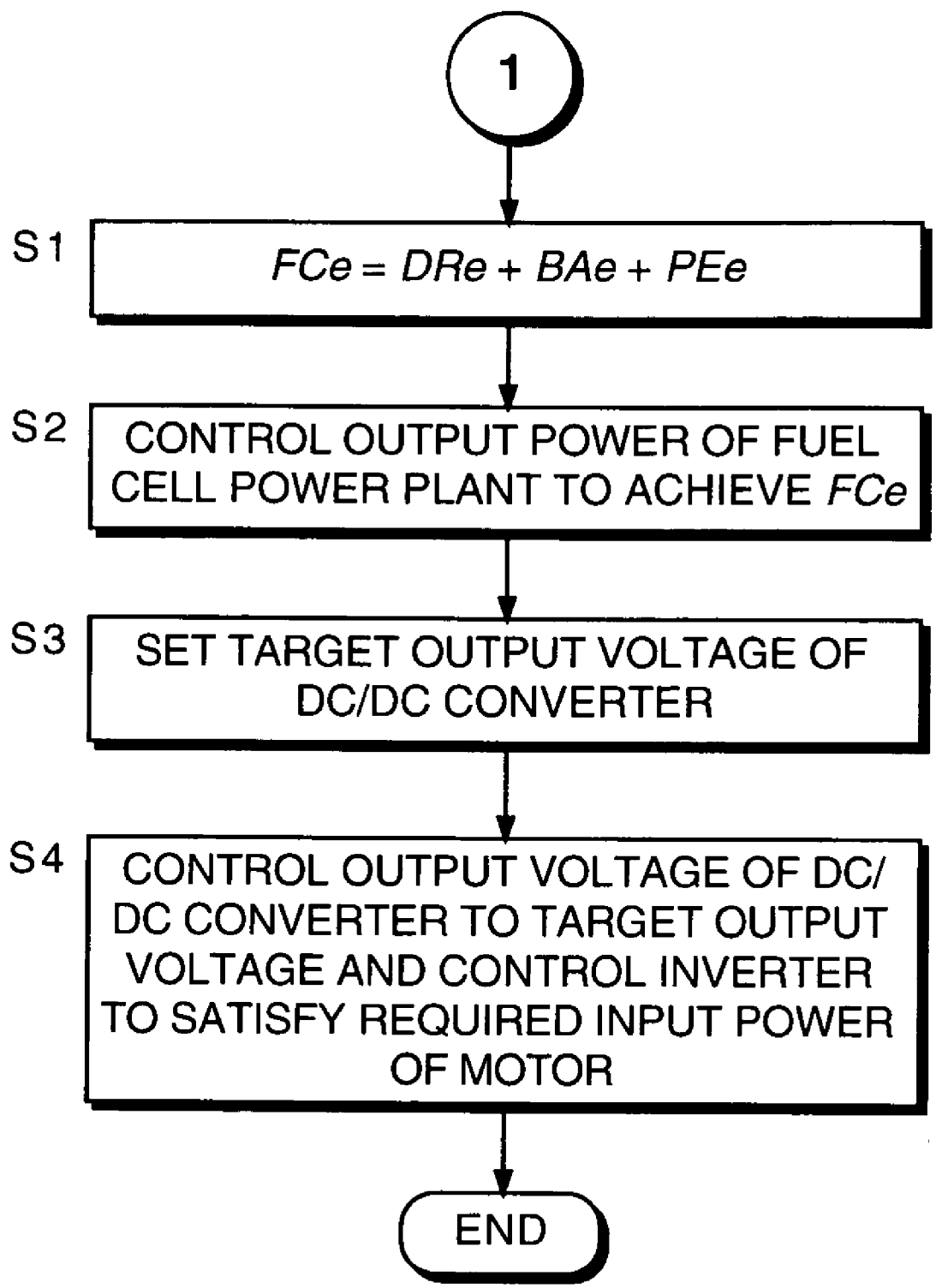

Referring to FIGS. 2A and 2B, a power generation control routine for the power source device 1 executed by the controller 10 will be described. This routine is executed at intervals of ten milliseconds when the vehicle is running.

Firstly in a step S11, the controller 10 read the depression amount of the accelerator pedal detected by the accelerator pedal depression sensor 21.

Then in a step S12, the controller 10 determines if a driver of the vehicle requires an acceleration of the vehicle running based on variation in the accelerator pedal depression amount.

When it is determined that the driver requires the acceleration of the vehicle running, an acceleration process in steps S13–S18 is executed.

When it is determined that the driver does not require the acceleration of the vehicle running, a non-acceleration process in steps S1–S4 is executed. When the driver does not require the acceleration of the vehicle running, the fuel cell vehicle will run in a steady state or decelerate.

Firstly, a non-acceleration situation will be described.

Referring to FIG. 2B, firstly in the step S1, the controller 10 calculates a required output power FCe required to the fuel cell power plant 2. The required output power FCe is the sum of an inverter required power DRe, a battery required power BAe and an accessory required power PEe.

The inverter required power DRe corresponds with power consumed by the electric synchronous motor 5 for driving the vehicle and is calculated in the following process.

Specifically, a target rotation speed and a target output torque are set for the electric synchronous motor 5. In particular, the target rotation speed of the electric synchronous motor 5 is obtained by looking up a map which defines it according to the vehicle speed as a parameter. The target output torque of the electric synchronous motor 5 is obtained by looking up a map which defines it according to the accelerator pedal depression amount as a parameter. These maps are pre-stored in the ROM of the controller 10.

The product of the target rotation speed and the target output torque represents the target output power of the electric synchronous motor 5. The controller 10 calculates the required input power of the electric synchronous motor 5 by dividing the target output power by the operating efficiency of the electric synchronous motor 5. The controller 10 then calculates the inverter required power DRe by dividing the required input power of the synchronous motor 5 by an inverter efficiency that is the power supplied to the electric synchronous motor 5 divided by the power consumed by the inverter 4. When the electric synchronous motor 5 is operated as a generator during regenerative braking, target torque is a negative value. Thus the inverter required power DRe is also a negative value.

The battery required power BAe is the power required for maintaining the SOC of the secondary battery 3 to a predetermined range. The value of BAe is set by the controller 10 in response to the SOC detected by the SOC sensor 22. In other words, when the SOC falls below the predetermined range, the controller 10 sets the battery required power BAe to a positive value so as to charge the secondary battery 3.

When the SOC increases to a value above the predetermined range, the controller 10 sets the battery required power BAe to a negative value so that the secondary battery 3 discharges power. A map using the SOC for calculating the battery required power BAe is pre-stored in the ROM of the controller 10. The controller determines the battery required power BAe by looking up the map on the basis of the SOC detected by the SOC sensor 22.

The accessory required power PEe is the sum of the power used in the accessory circuit 7 for the fuel cell power plant and the power used in the accessory circuit 8 for the vehicle. The controller 10 sets the accessory required power PEe in response to the operation of the respective accessories in the accessory circuits 7 and 8.

After calculating the required output power FCe of the fuel cell power plant 2 in this way, in the step S2, the controller 10 controls the operation of the fuel cell power plant 2 based on the required output FCe. In other words, a target output voltage for the fuel cell power plant 2 is set and the flow rate of hydrogen is controlled so that the required output power FCe is achieved. The target output voltage of the fuel cell power plant 2 is calculated using the required output power FCe by looking up a map pre-stored in the ROM which has the characteristics as shown in FIG. 3.

Figure 3:
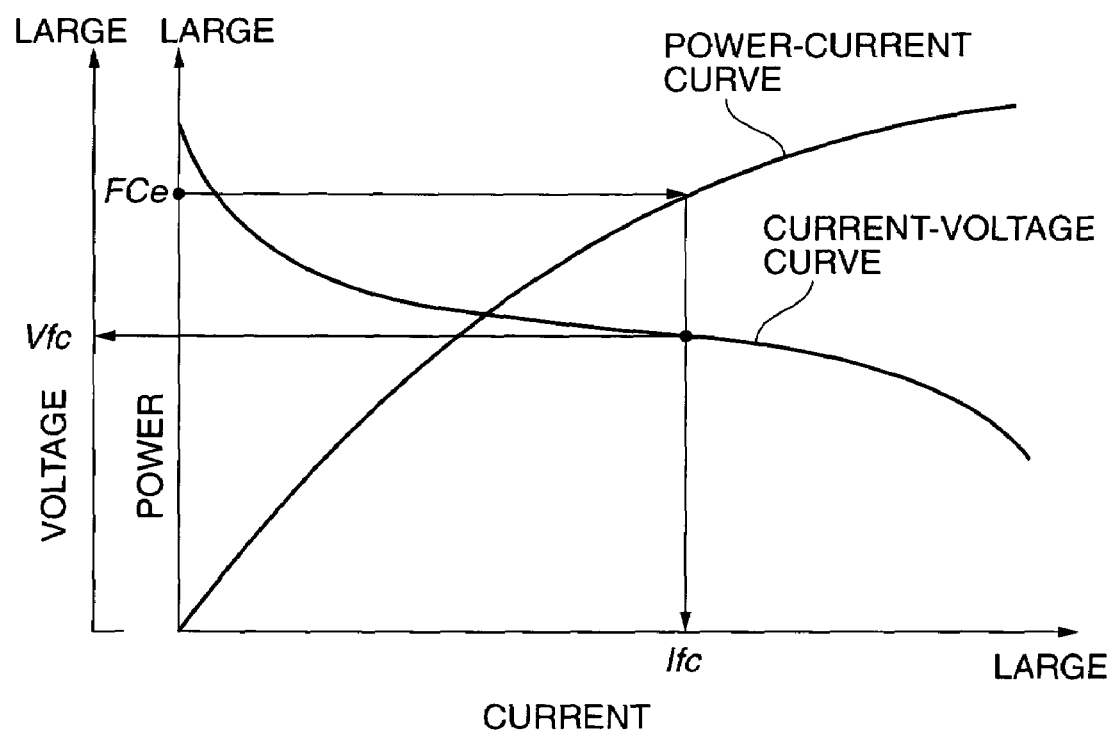
FIG. 3 is a diagram showing the characteristics of an output power map for a fuel cell power plant stored in the controller.

FIG. 3 shows the relationship between power and current and current and voltage. The controller 10 calculates a required current Ifc by plotting the required output power FCe on a power-current curve. Then the required voltage Vfc is calculated by plotting the required current If on the current-voltage curve.

A target flow rate of hydrogen is determined in order to realize the required power output FCe at the required voltage Vfc. The fuel cell power plant 2 is then controlled in order to achieve the target flow rate.

In the following step S3, the controller 10 sets the target output voltage of the DC/DC converter 6.

When the secondary battery 3 discharges power, in other words, when the battery required power BAe is a negative value, the DC/DC converter 6 receives an input current from the secondary battery 3 and outputs a current to the terminal 1A or the accessory circuits 7, 8. In this case, the controller 10 sets the target output voltage of the DC/DC converter 6 to a value which is equal to the required voltage Vfc of the fuel cell power plant 2.

When the secondary battery 3 performs charging operations, in other words, when the battery required power BAe is a positive value, the DC/DC converter 6 receives a current from the terminal 1A and outputs a current to the secondary battery 3. In this case, the controller 10 sets the target output voltage of the DC/DC converter 6 to a value adapted for charging the secondary battery 3. This target output voltage may be a fixed value or may varies within a predetermined range in response to the battery required power BAe.

In the following step S4, the controller 10 controls the DC/DC converter 6 so that the output voltage of the DC/DC converter 6 coincides with the target output voltage and controls the inverter 4 so that the required input power of the electric synchronous motor 5 is supplied to the electric synchronous motor 5. After the process in the step S4, the controller 10 terminates the routine.

During steady state operation, the controller 10 controls the output of the fuel cell power plant 2, the power supplied to the electric synchronous motor 5 via the inverter 4 and the output voltage of the DC/DC converter 6 every ten milliseconds in this way.

When there is a response delay in the output gain of the fuel cell power plant 2 relative to the increase in the required output power FCe, the difference between the real output of the fuel cell power plant 2 and the required output power FCe is compensated by the output variation in the secondary battery 3. In this case, as the real output of the fuel cell power plant 2 approaches the required output power FCe, the output of the secondary battery 3 is gradually reduced to the battery required power BAe. The secondary battery 3 has the function of increasing the response characteristics of power supply relative to variation in the required output power FCe.

In this power source device 1, accessory circuit 7 for the fuel cell power plant and the accessory circuit 8 for the vehicle are connected directly to the terminal 1A without passing through the DC/DC converter 6.

When the vehicle is not accelerating, power required by the accessory circuit 7 for the fuel cell power plant and the accessory circuit 8 for the vehicle is supplied from the fuel cell power plant 2 or from the electric synchronous motor 5 during regenerative braking operations. As the power supplied to the accessory circuits 7, 8 in this situation does not pass through the DC/DC converter 6, power loss in the power source device 1 is suppressed to a low level, so the energy efficiency of the device 1 is higher than the prior art power source device.

When the secondary battery 3 discharges power, a portion of the power consumed by the accessory circuits 7 and 8 may be supplied from the secondary battery 3 via the DC/DC converter 6. In this case, power loss in the DC/DC converter 6 occurs, but does not present a problem for energy efficiency because the power discharged from the secondary battery 3 is the excess power of the secondary battery 3.

Referring again to FIG. 2A, when it is determined that the driver does not require the acceleration of the vehicle running in the step S12, the controller 10 calculates the required output power FCe of the fuel cell power plant 2 in the following step S13. Since the secondary battery 3 is not charged when the acceleration of the vehicle running is required, the required output power FCe in this situation is the sum of the inverter required power DRe and the accessory required power PEe.

The inverter required power DRe is calculated by the controller 10 by the method described in the step S1 above. The inverter required power DRe increases when the acceleration of the vehicle running is required.

The accessory required power PEe is set by the controller 10 in response to the drive state of the accessories in the accessory circuits 7 and 8 as described in the step S1 above. Since the accessory circuit 7 for the fuel cell power plant 2 comprises the heater or the pumps required for operation of the fuel cell power plant 2, the accessory required power PEe also increases when the acceleration of the vehicle running is required.

Figure 4A:
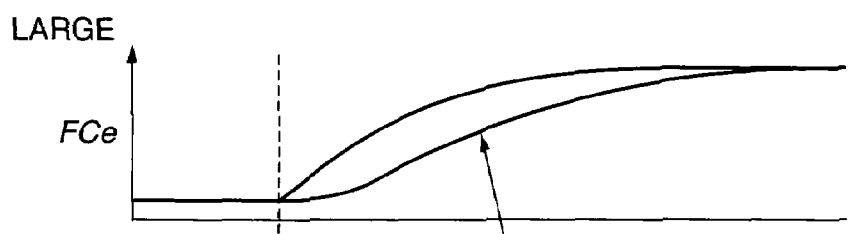
FIGS. 4A–4D are timing charts showing the variation in a required electric power for vehicle running, an output electric power of the power plant, an output voltage of the power plant, and an output electric power of the secondary battery during vehicle acceleration according to the power control routine.

Thus as shown by the solid line in FIG. 4A, the required power output FCe increases from the time t1 at which the acceleration of the vehicle running is first required.

Then in the step S14, the controller 10 controls the flow rate of hydrogen in the fuel cell power plant 2 in order to realize the required output power FCe.

Then in the step S15, a value for the possible supplied power FCe1 is calculated which is within capability of the fuel cell power plant 2. Since the increase in the output power of the fuel cell power plant 2 is delayed relative to the increase in the required output power FCe, the power which can be actually supplied at that point in time is calculated as the possible supplied power FCe 1.

Time lag in hydrogen supply represents one possible reason for the delay in the reactions in the fuel cell power plant 2. The controller 10 increases the supplied amount of hydrogen to the fuel cell power plant 2 corresponding to the increase in the required power output FCe. However time is required for the actual flow rate of hydrogen to increase when hydrogen is obtained from reforming reactions on a hydrocarbon fuel.

Figure 4B:

As shown in FIG. 4B, the possible supplied power FCe1 takes the time lag into account. As shown by FIG. 4A when the possible supplied power FCe1 falls below the required power output FCe, the output voltage Vfc of the fuel cell power plant 2 falls as shown by the broken line in FIG. 4C. When increases in the possible supplied power FCe1 follow the required output power FCe, the output voltage Vfc returns to its original value.

In order to compensate for voltage reductions, in a step S16, the controller 10 calculates the output power BAe of the secondary battery 3 as the difference of the required output FCe and the possible supplied power FCe1.

Figure 4C:
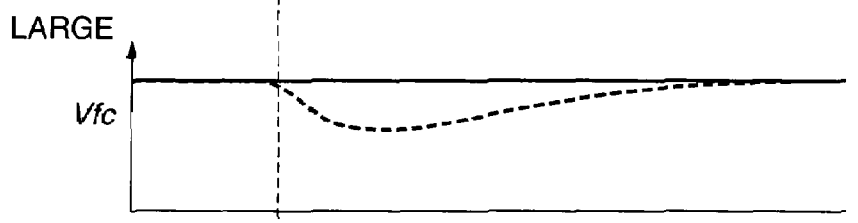
Figure 4D:
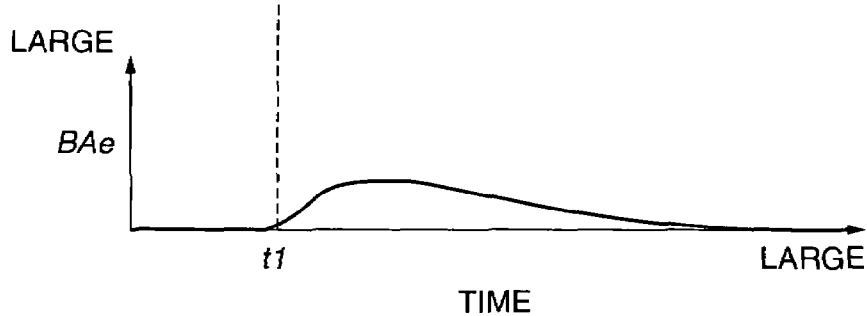

Then in a step S17, the controller 10 sets the target output voltage of the DC/DC converter 6 to a predetermined rated voltage, in other words, to the value before the time t1 in FIG. 4C.

Then in a step S18, the controller 10 controls the output voltage of the DC/DC converter 6 to the target output voltage. The inverter 4 is controlled so that the power required by the electric synchronous motor 5 is supplied. After the process of the step S18, the controller 10 terminates the routine.

In this manner, when the possible supplied power FCe1 temporarily falls below the required output power FCe as a result of acceleration, a reduction in the output voltage Vfc of the fuel cell power plant 2 is prevented by supplying power from the secondary battery 3. Consequently there is no effect on driving the accessories in the accessory circuits 7 and 8.

After accelerating the vehicle, when the vehicle is operating at a constant high speed, it is determined that acceleration is not required in a step S12 and the process in the steps S1–S4 are performed again.

In this manner, the power source device 1 connects accessory circuits 7 and 8 in parallel to the terminal 1A connected to the fuel cell power plant 2. Since the secondary battery 3 is connected to the terminal 1A through the DC/DC converter 6, it is possible to drive the accessories in the accessory circuits 7 and 8 using the output current of the fuel cell power plant 2 without a power loss related to the DC/DC converter 6.

Furthermore power losses resulting from line resistance can be reduced to low levels by setting the length of wire connecting the accessory circuit 7 and the terminal 1A to be shorter than the length of wire connecting the accessory circuit 8 to the terminal 1A providing that the accessory circuit 7 consumes much more electric power than the accessory circuit 8. Thus the energy efficiency of the fuel cell vehicle is improved.

During vehicle acceleration, since the temporary voltage reduction resulting from a response delay in the fuel cell power plant 2 is compensated by controlling the output voltage of the DC/DC converter 6, there is no fluctuation in the power supplied to the accessory circuits 7 and 8 during vehicle acceleration.

The DC/DC converter 6 only controls the charging/discharging of the secondary battery 3. Thus it is possible to perform highly accurate charging by regenerative braking or charging when the SOC has fallen and discharging when the output of the fuel cell power plant 2 is not sufficient.

The contents of Tokugan 2003-004858, with a filing date of Jan. 10, 2003 in Japan, are hereby incorporated by reference.

Although the invention has been described above by reference to certain embodiments of the invention, the invention is not limited to the embodiments described above. Modifications and variations of the embodiments described above will occur to those skilled in the art within the scope of the claims.

The embodiments of this invention in which an exclusive property or privilege is claimed are defined as follows:

What is claimed is:

1. A power source device supplying power to an electric motor and an accessory circuit, comprising:
   a fuel cell power plant having an output terminal to which the electric motor and the accessory circuit are connected in parallel;
   a power storage device connected to the output terminal, the power storage device performing a charging operation and a discharging operation; and
   a DC/DC converter which regulates an input voltage of the power storage device in a charging operation and an output voltage of the power storage device in a discharging operation, the DC/DC converter being disposed between the power storage device and the terminal;
   wherein:
   the accessory circuit is connected to the output terminal not via the DC/DC converter, and
   the accessory circuit comprises:
      a first circuit and a second circuit, wherein the first circuit consumes more power than the second circuit, and
      a length of wire connecting the first circuit and the terminal is shorter than a length of wire connecting the second circuit and the terminal.

2. The power source device as defined in claim 1, wherein the power source device further comprises a controller programmed to control the DC/DC converter to cause the output voltage of the power storage device in a discharging operation to be equal to an output voltage of the fuel cell power plant.

3. The power source device as defined in claim 2, wherein the controller is further programmed to control the DC/DC converter to cause the input voltage of the power storage device in a discharging operation to be equal to a predetermined charging voltage.

4. The power source device as defined in claim 2, wherein the power source device further comprises a sensor which detects an acceleration requirement to the electric motor, and the controller is further programmed to control the DC/DC converter to maintain the output voltage of the power storage device in a discharging operation at a value equal to the output voltage of the fuel cell power plant before the acceleration requirement is detected.

5. The power source device as defined in claim 4, wherein the electric motor comprises a motor for driving a vehicle, and the sensor comprises a sensor which detects a depression amount of an accelerator pedal with which the vehicle is provided.

6. The power source device as defined in claim 1, wherein the power storage device comprises a secondary battery.

7. The power source device as defined in claim 1, wherein the power storage device comprises a capacitor.

8. The power source device as defined in claim 1, wherein the electric motor comprises an alternating current synchronous motor connected to the output terminal through an inverter.

* * * * *